Nov. 17, 1970  W. J. SMITH ET AL  3,540,804
DIRECT READING OPTICAL MEASURING DEVICE
Filed June 14, 1968  5 Sheets-Sheet 1

INVENTORS
WARREN J. SMITH
MAX J. RIEDL
GORDON D. HERNLUND
DONALD B. HEALY

*Dominik, Knechtel & Godula* ATTYS.

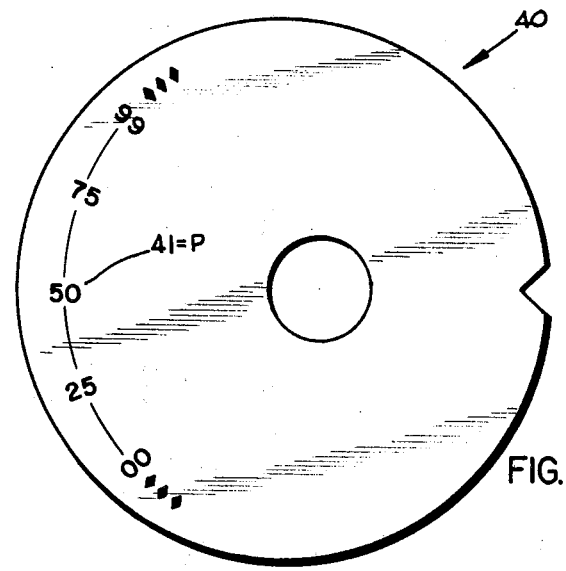
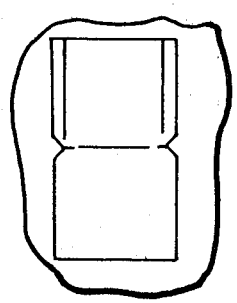
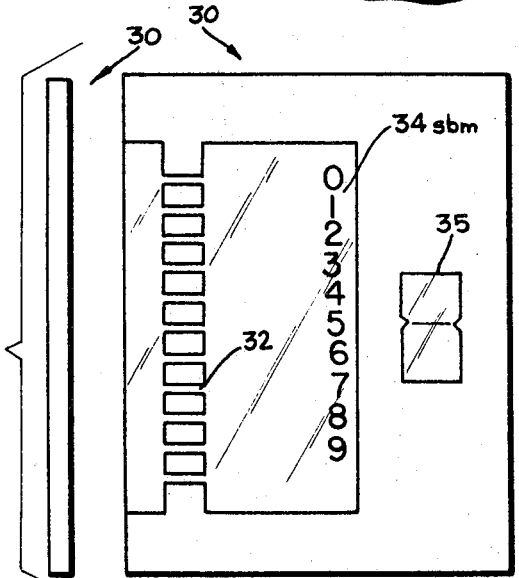
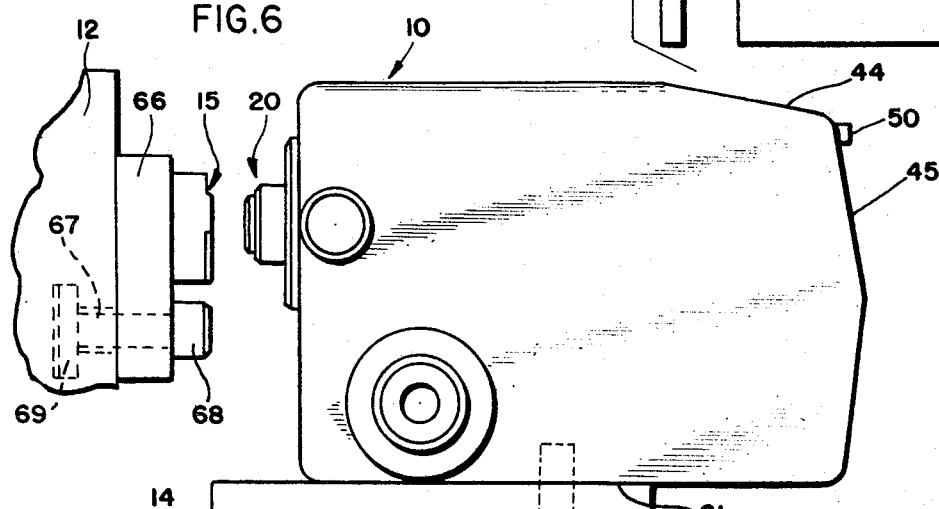
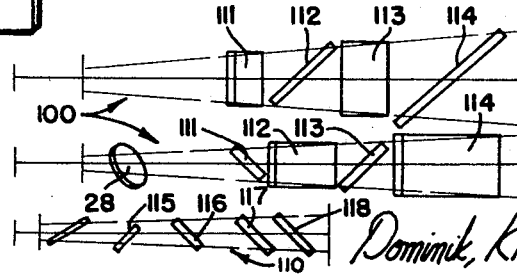

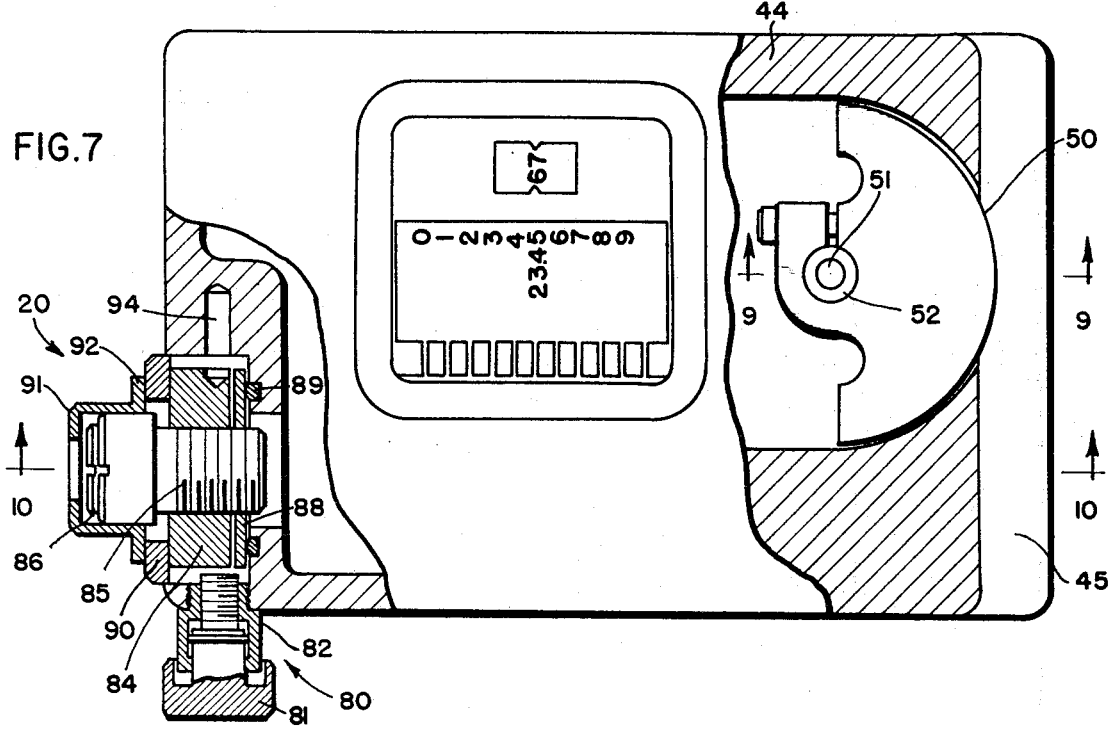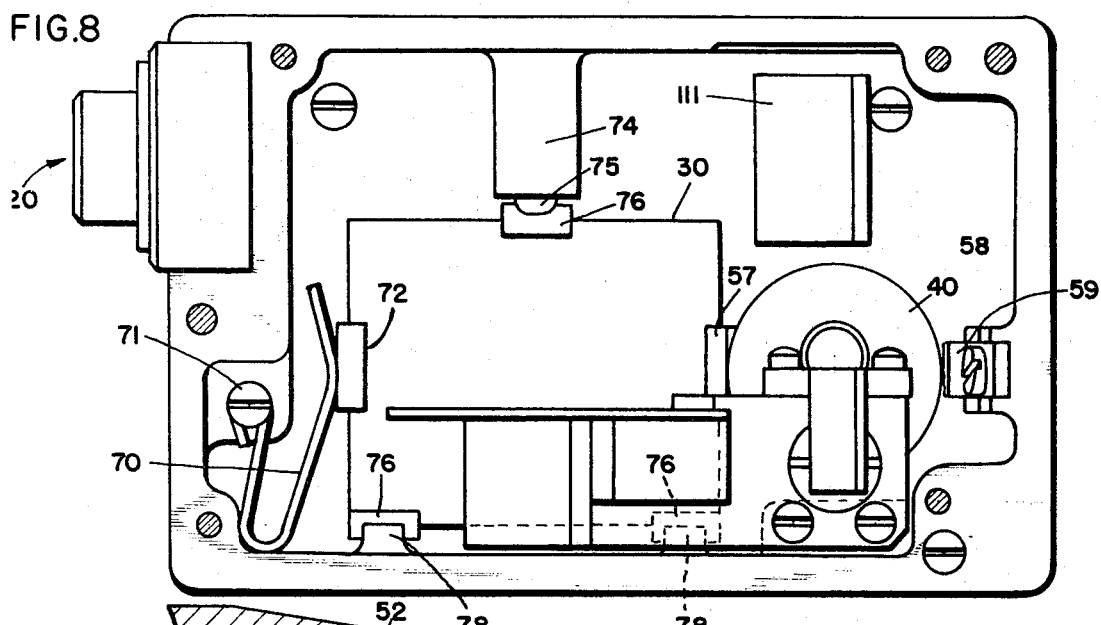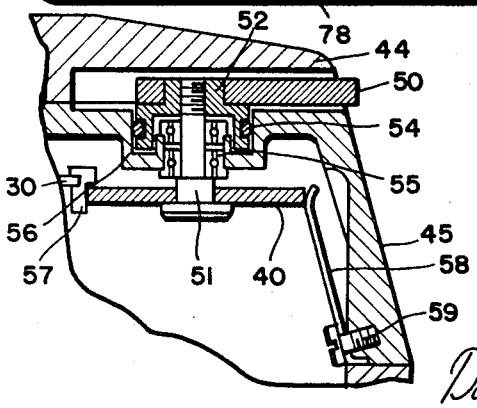

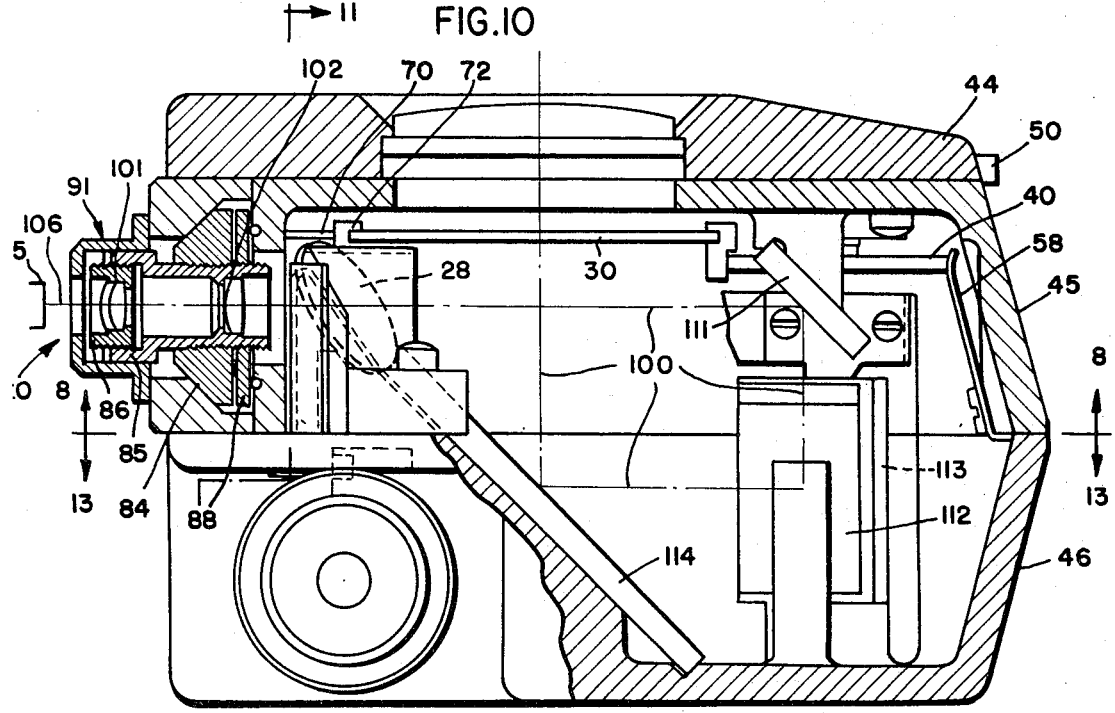
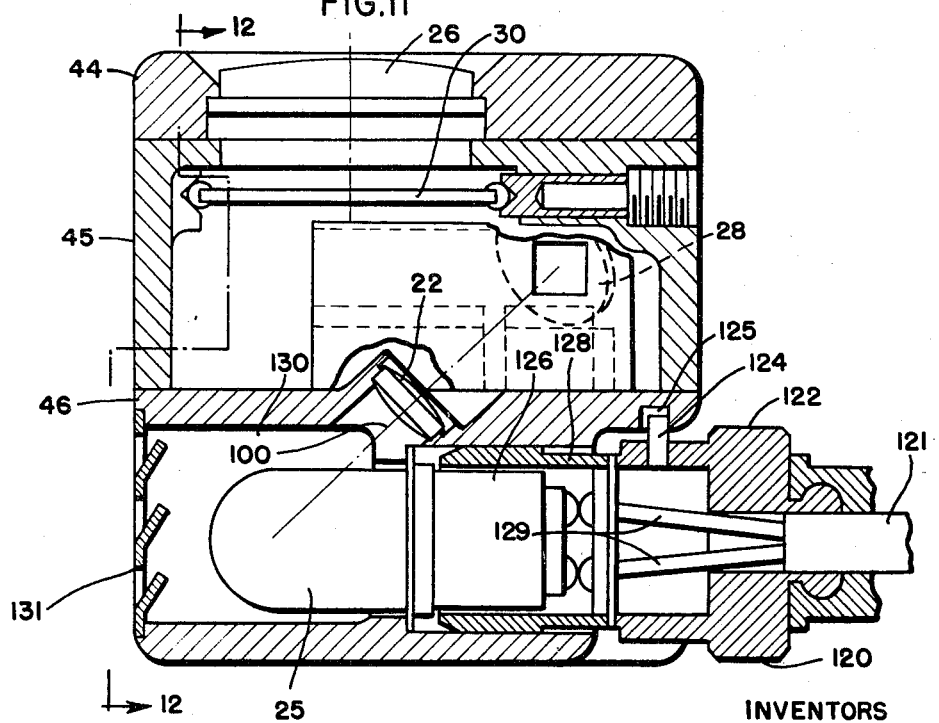

Nov. 17, 1970  W. J. SMITH ET AL  3,540,804
DIRECT READING OPTICAL MEASURING DEVICE
Filed June 14, 1968  5 Sheets-Sheet 5

INVENTORS
WARREN J. SMITH
MAX J. RIEDL
GORDON D. HERNLUND
DONALD B. HEALY

*Dominik, Knechtel, & Godula* ATTYS.

United States Patent Office 3,540,804
Patented Nov. 17, 1970

3,540,804
DIRECT READING OPTICAL MEASURING DEVICE
Warren J. Smith, Max J. Riedl, Gordon D. Hernlund, and Donald B. Healy, Santa Barbara, Calif., assignors to Infrared Industries, Inc., Santa Barbara, Calif., a corporation of Delaware
Filed June 14, 1968, Ser. No. 737,108
Int. Cl. G03b 21/00
U.S. Cl. 353—41        13 Claims

ABSTRACT OF THE DISCLOSURE

A precision optical reader and method is shown in which a scale scanning objective views line indicia spaced at $1/n$ and numerical indicia associated with each line. A shiftable screen having line indicia and numerical indicia of $1/nm$ associated therewith is slidably mounted for longitudinal shifting within a housing. The shiftable screen is moved by means of a sector cam having eccentricity proportioned to shift the shiftable screen to position its line indicia in an optically coupled relationship with the line indicia projected from the scale. A numbered sector having numerical indicia $1/nmp$ is associated with the cam, and optical means are provided to transfer the indicia onto a screen which reads in an ordered sequence numerically the divisions of measurement. The method contemplates shifting a vernier type divider with a rotating member having peripheral eccentricity and utilizing the radial displacement of the rotating member to divide further the scale distance.

---

The present invention relates to a direct reading optical measuring device and method, and more particularly such a direct reading device and method for translating measurement indicia on a scale into a window which reads out directly a division between the linear indicia on the scale into 1000 parts.

In measuring the bed travel of machine tools and measuring instruments, the art shows examples of optical measuring devices for proportioning the position of the bed and reading the same by dividing indicia on a scale which is on the moving bed. Such optical reading devices are exemplified in Pats. 2,959,087; 3,363,963; and 3,106,127.

As the art has progressed, it has become abundantly apparent that several shortcomings exist in varying combinations in the available products. For example, in some instances, such as exemplified in Pat. 2,959,087, a compound type mount is required to secure the unit to the machine tool because a squared relationship between the optical device, scale, and moving bed as well as supporting bed has not been achieved. Also, as exemplified by the other two patents, direct reading from left to right of the total numerical reading, has not been readily achieved. In the English system present manufacturing tolerances require a reading to a precision of plus or minus .0001", and the trade insists upon an ordered sequential numerical readout. Finally, while the various structures shown in the prior art have attempted to solve the problem of retrofit mounting in various ways, they are all subject to a problem with the clearance limitation between the optical axis of the objective of the reader and the top of the housing holding the reader which can interfere with auxiliary material mounted on the moving bed, and the like.

In view of the foregoing, it is the principal object of the present invention to provide a direct reading optical measuring device in which the presentation of measuring indicia is read out directly from left to right requiring no interpolation or other transfer, addition, or compound figuring. A related feature of the invention looks to the provision of just such a direct reading optical measuring device, in which, utilizing the English system of measurement, accuracies of plus or minus .0001" can be directly read such as 12.3456".

Another significant object of the present invention is to provide a direct reading optical measuring device in which commercial units can be fabricated where the distance between the optical axis of the main objective and the top of the housing of the unit is minimized, preferably held to a 1" maximum. Related closely to the object of minimizing the relationship between the top of the unit and the optical axis of the objective, is a further object of the present invention to render rectilinear all major relationships between the scale, moving bed of the machine tool, optical axis of the reader, and mount to the machine tool bed. To further facilitate mounting, the reader is proportioned for very compact construction and mounting clearance.

A more detailed object of the present invention looks to the provision of a precision optical direct reading device in which scale information indicia spaced at every .1", thereby reducing scale cost, can still be precisely divided and readout directly to accuracies of plus or minus .0001". A further object of the invention is to provide a direct reading optical measuring device in which the scales to be read can be butted together thereby providing unusual length, the same still being compatible with direct reading and accuracy of plus or minus .0001".

Other objectives of the present invention are achieved by providing a knurled adjusting knob which can be recessed within the housing offering protection in use from bumping and maladjustment, and minimizing external projections. Simplified mounting is provided with only two screws required to secure the optical reader housing to a simple mount provided on the machine tool bed. Furthermore, the optical system permits a substantial illumination increase over the prior art, and still provides a 2000 hour life of the single bulb which is employed to illuminate the scale and readout window. A further object of the invention is to provide a measuring device with the foregoing advantage which is effectively sealed against normal environment contaminants such as cutting oils, chips, moisture, and the like.

In broad outline the direct reading optical measuring device contemplates a scale scanning objective lens for reading a scale having line indicia at $1/n$ spacing with numerical indicia associated with each $1/n$ line. A shiftable screen having line indicia and numerical indicia of $1/nm$ associated therewith is slidably mounted for longitudinal shifting within housing. Optical means are employed for projecting the scale indicia by the objective onto the screen for alignment with the shiftable screen line indicia, preferably in a straddle-like form. The shiftable screen is moved by means of a sector cam which may be optionally of optically polished material, the eccentricity of the cam being proportioned to shift the shiftable screen to position its line indicia in a coupled relationship with line indicia projected from the scale. A numbered sector having numerical indicia $1/nmp$ may be optionally provided on the cam, the same being optically transmitted to the window adjacent the numerical indicia on the shiftable screen to thereby read out the indicia dividing the $1/n$ indicia on the scale into the cam indicia reading of $1/nmp$, the shiftable screen having provided the $1/nm$ reading. In the above formula:

$n$=the reciprocal of the uniformly spaced indicia
$m$=the shiftable screen division of $1/n$
$p$=the cam sector division of $1/nm$.

Therefore, in the English system where $n=10$, $m=10$, and $p=100$, the indicia readout is sequentially $\frac{1}{10}$; $\frac{1}{100}$; $\frac{1}{1,000}$ and $\frac{1}{10,000}$ inches. The same formula is applicable to dividing metric or angular measurement. The optical system includes beam splitters and projection mirrors as well as emphasis area in the readout window to the end that all of the pertinent indicia relevant to the measurement being taken are highlighted on the readout window thereby reducing the possibility of error in reading. Zero shifters may be employed on the scale as well as being provided on the reading device. The optical axis of the objective is positioned near the top of the reader housing as are the shiftable screen and the eccentric cam, the illumination and image transmitting portion of the optical system being positioned at the lower portion of the housing to the end that the distance between the optical axis of the objective lens and the top of the housing is minimized.

The method illustrative of the invention of dividing scale indicia contemplates shifting a vernier type divider with a rotating member having peripheral eccentricity and utilizing the radial displacement of the rotating member to divide further the scale distance.

Further objects and advantages, as well as a clarity of understanding of the inventive concepts will be more fully understood as the following description of a commercial embodiment proceeds, taken in conjunction with the accompanying drawings in which:

FIG. 3 is a plan view of the sector cam shown perspectively in FIG. 2 in its coacting relationship with the shiftable screen.

FIG. 4 is a combination plan and end view of the shiftable screen.

FIG. 5 is an enlarged broken view of the shiftable screen illustrating the sector scale window for reading out the appropriate indicia on the sector scale.

FIG. 6 is a side elevation, partially broken, illustrating the mounted relationship between the illustrative direct reading optical measuring device, its scale, and the machine tool bed to which the scale is affixed.

FIG. 7 is a partially broken, partially sectioned top view of the illustrative direct reading optical measuring device shown in side elevation in FIG. 6.

FIG. 8 is a bottom view of the direct reading optical measuring device taken generally along section lines 8—8 of FIG. 6.

FIG. 9 is an enlarged partially broken section view showing the relationship between the adjusting knob and sector cam, taken along section lines 9—9 of FIG. 7.

FIG. 10 is a transverse view of the optical measuring device taken along section lines 10—10 of FIG. 7, showing the scale objective and the scale optical system.

FIG. 11 is a partially diagrammatic view taken from the front of the optical measuring device illustrating the relationship between the illuminating lamp and shiftable screen.

FIG. 14 is a composite diagrammatic view of the scale system and sector system.

Figure 1:
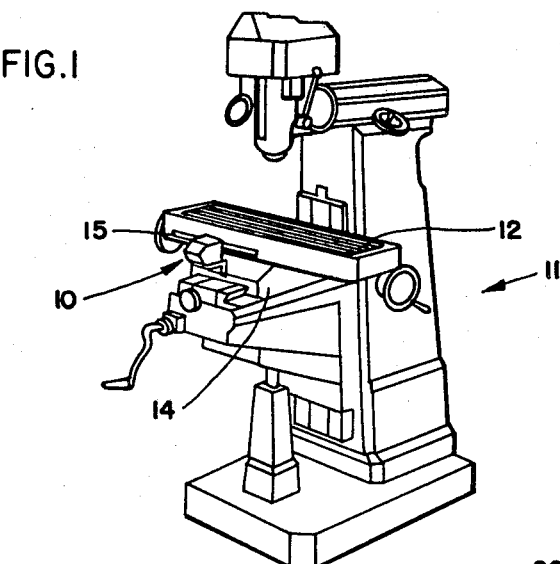
FIG. 1 is a perspective view illustrating a typical machine tool on which the direct reading optical measuring device illustrative of the present invention is installed.

As set forth in the objects of the invention above, one of the principal uses in which the optical measuring device illustrative of the invention finds utility is in the machine tool art. More specifically, as will be seen in FIG. 1, the optical measuring device 10 is employed on a milling machine 11 to measure the travel of the moving bed 12. To achieve this end, the optical measuring device 10 is mounted to the bed ways 14 and oriented to read the travel of a scale 15 which is fixedly secured to the moving bed 12. In the illustrative milling machine shown, the optical measuring device is used to read the direction of travel in one axis only, but it will be appreciated that similar mountings on the cross-feed can be made, and the cross-feed read with the same degree of accuracy as the linear travel. The readout which will be described in the balance of this specification is from a scale divided in the English system of .1″. As set forth above, and as will become apparent in the detailed description, divisions in the metric system can also be made, and the same principle can be employed to divide arcuate dimensions with similar precision.

Figure 2:
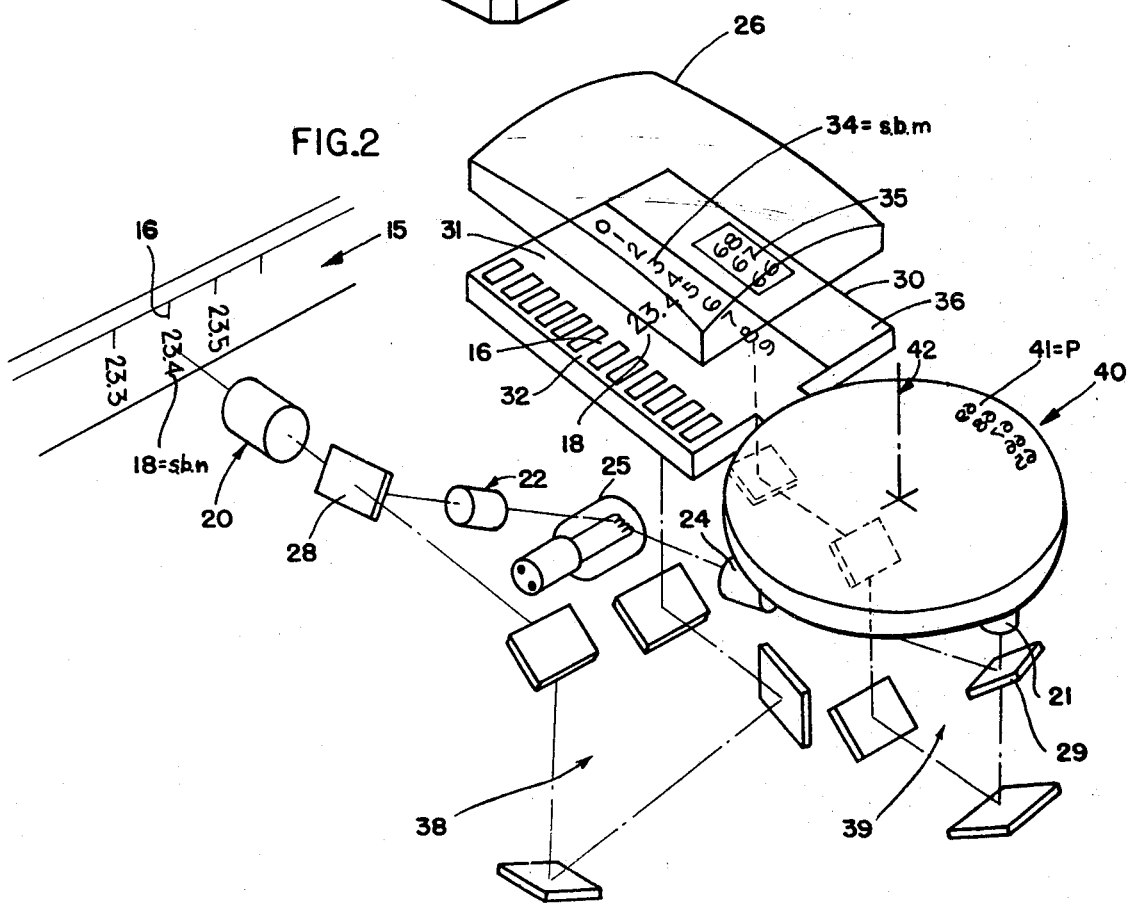
FIG. 2 is a schematic diagram of the principal scale dividing elements and optical system of the illustrative direct reading optical measuring device.

Turning now to FIG. 2 which illustrates schematically the principal components of the optical measuring device 10, it will be seen that the numerical scale indicia 18 are presented for reading on a shiftable screen 30 in such a manner that when the scale line indicia 16 are oriented in one of the slots 32 on the shiftable screen 30, the entire dimension to the nearest plus or minus $\frac{1}{10,000}$″ is read from left to right, as illustrated, 23.4567″. In the illustration shown, the scale line indicia 16 coincidentally is aligned with the sector scale indicia 41 in a left to right reading. This will not always be the case in that when the scale line indicia 16 and its associated numerical indicia 18 are near the top or the bottom of the shiftable screen 30, four digits will read directly from left to right, and the last two digits will be picked up from the sector scale window 35 defined by the sector scale window mask 36 in a presentation of the sector scale indicia 41. It will thus be appreciated that in principle the division between the scale line indicia 16 is performed by the rotation of the sector cam 40 which is mounted on a sector cam axis 42 therefore permitting the eccentricity of the cam, through its rotation, to simultaneously shift the shiftable screen 30 for aligning the line indicia 16 in the line slot 32 while measuring with a high degree of percision the shifted distance through the readout of the appropriate sector scale numbers 41.

To further appreciate the operation of the optical measuring device 10, the optical system itself is set forth in schematic detail on FIG. 2. There it will be seen that the scale objective 20 is positioned to read both the scale line indicia 16 and the scale numerical indicia 18. The spacing between the adjacent scale line and numerical indicia 16, 18 approximates the distance between the top and the bottom of the shiftable screen 30 when transmitted through the optical system. Where illustrated, the scale line and numerical indicia 16, 18 are positioned at a midpoint in the shiftable screen 30, but could be closer to the top or the bottom of the shiftable screen 30 depending upon the position of the moving bed 12 and its associated scale 15 as the same is stopped for measurement.

After the image is picked up by the scale objective 20 it is projected by means of the scale mirror system 38 onto the shiftable screen 30. Similarly, the sector objective 21 picks up the appropriate numerical indicia 41 from the sector cam 40 and projects the same by means of the sector mirror system 39 to the sector scale window 35 on the shiftable screen 30. To illuminate both systems, a single lamp 25 is employed, the light from which is transmitted respectively by a scale condenser 22 to the scale mirror system 38, and a sector condenser 24 to the sector mirror system 39 by means of a scale semi-reflector 28 and a sector semi-reflector 29. Thus a single lamp 25 with a designed life of 2,000 hours can be removably placed within the housing of the optical measuring device 10, and provide sufficient illumination for reading the entire dimension as required based upon the position of the moving bed 12 of the milling machine 11, or other machine tool employed.

Furthermore, it will become apparent from the perspective schematic presentation in FIG. 2, that the shiftable screen 30 and the sector cam 40 are substantially coplanar, and at the upper portion of the housing for the optical measuring device 10. The scale objective 20 also is close to the top of the housing of the optical measuring device 10, but only slightly beneath the plane of the shiftable screen 30 and sector cam 40 as will be observed in FIG. 10. The result of this position and orientation, with the scale mirror system and the sector mirror system mounted in the lower portion of the housing, permits the construction of a unit with a minimized top clearance. Furthermore, as observed in FIG. 10, the adjustment knob 50 is positioned at the top and the rear of the optical measuring device 10, in a protected noninterfering position. Thus the major portion of the optical system is mounted beneath the plane of the shiftable screen 30 and sector cam 40, as well as the axis of the objective 20. As the detailed description proceeds, it will be appreciated that this orientation of the optical system permits a compactness and miniaturization highly desirable in the machine tool art.

More particularly, with reference to FIG. 6, simplicity of mounting the optical measuring device to the host machine tool is facilitated by the perpendicular relationships of the optical system and housing therefor. As will be seen, a simple L-shaped mounting bracket 60 having a housing mounting face 61 and bed ways mounting face 62 secures the optical measuring device to the bed ways 14 by means of a pair of housing mounting bolts 64, and a pair of bed ways mounting bolts 65. In virtually all machine tools, a vertical face is machined on the bed ways 14 which, as illustrated in FIG. 6, serves to coact with the bed ways mounting face 62 of the L-shaped mounting bracket 60 to provide a horizontal plane for the housing mounting face 61. Since the optical axis of the scale objective 20 is parallel with the base of the housing of the optical measuring device 10, the scale 15 is also susceptible of mounting in a vertical orientation. In this respect it will be noted that a scale support 66 is provided to mount the scale 15, utilizing the moving bed T-slot 67 of the moving bed 12. Scale mounting bolts 68 are provided to secure the scale support 66 to the moving bed 12, and are locked in place by means of the scale mounting nuts 69. The resultant relationship of the principal alignment elements are therefore rectilinear, either parallel, or perpendicular, in all principal respects. While varying machine tool designs will necessitate varying constructions of the mounting bracket 60, it will be appreciated that the various mounting brackets required depending upon the machine tool can be easily fabricated requiring only two perpendicular faces 61, 62, and four bolt holes. Similarly the scale 15 and its associated scale support 66 are readily mountable in the T-slot 67 generally found as standard equipment on most machine tools having moving beds. Thus, for factory installation with new machine tool equipment, or retrofit in the field, simplicity of mounting has been achieved by the provision of principal rectilinear relationships, compact design, and minimizing the height of the optical measuring device 10 above the principal axs of the scale objective 20.

The details of the relationship between the adjusting knob 50 and the sector cam 40 are shown in FIG. 9. The semi-circular adjusting knob 50 is secured to a shaft 51 mounted in a bearing retainer 52. The bearing retainer 52 is positioned within a seal cup 56 in the upper housing 45 and an O-ring 54 seals the inner portion of the housing from environmental contaminants. The bearing 55 journals the shaft 51 for rotation of the sector cam 40 in direct angular response to the rotation of the adjusting knob 50. A cam follower 57 couples the shiftable screen 30 and sector cam 40 in shiftable cammed relationship. The sector cam counter spring 58 secured by means of sector cam counter spring mount 59 to the upper housing 45 reacts against the rotation of the sector cam 40. Opposing the action of the sector cam spring counter 58, a cam spring 70 is provided to act on the shiftable scale 30 in opposed relationship to the sector cam spring 58. As will be observed particularly in FIG. 8, the sector cam counter spring 58 is a leaf spring, whereas the cam spring 70 is a bent wire structure mounted at one end by means of the cam spring mount 71. A cam spring follower 72, preferably made of an inert material with a good degree of surface lubricity such as nylon, is slotted to fit over the shiftable scale 30, and has a recess in its outer portion to engage the cam spring 70. The additional slideable mounting of the shiftable screen 30 is provided by means of the pressure pin post 74 having a pressure pin 75 spring loadedly mounted therein to apply pressure against the shoe 76 which is sloted for engagement with the shiftable screen 30 as is the cam follower 57 and the counter-spring follower 72. To provide for full floating adjustment, the pressure pin shoe 76 as well as the shoes 76 supported by the shoe supports 78 in opposed relationship to the pressure pin 75, are round, engaging V-shaped notches in their respective supports. Accordingly, the pressure pin 75 has a V-shaped outer configuration in which the rounded outer portion of the shoe 76 is free to float in tangential contact. Similarly, the shoe supports 78 are provided with V-shaped notches to permit the respective shoe 76 to ride in self-orienting tangential contact. Thus when the adjusting knob 50 is rotated, the shaft 51 drives the sector cam 40 which in turn transmits the motion through the sector cam follower 57 to the shiftable screen 30. This action is balanced by means of cam spring 70 coacting with the sector cam counter spring 58 so that to the user a uniform resistance to motion is presented to the touch of the adjustment knob 50. The pressure pin 75 coacts with the three shoes 76 to yieldably secure the shiftable screen 30 in its plane, the longitudinal motion being constrained by means of the cam follower 57 at the coupling point between the shiftable screen 30 and the cam sector 40, coacting with the action of the cam spring 70 and its associated spring follower shoe 72 to constrain the longitudinal orientation of the shiftable screen 30. It will be also appreciated as set forth above that the coaction of the sector cam counter spring 58 and the cam spring 70 effectively neutralizes the load on the bearing 55 associated with the adjusting knob 50. Since this bearing 55 journals the only movable assembly, the springs act to insure a longer bearing life as well as uniform sealed relationship of the bearing retainer 52 within the cover 44 and lower housing 45.

Because of mis-alignment or lack of immediate accuracy in a setup, it is highly desirable to provide a zero shifter for the scale objective 20. In this manner the operator, after setting up his work project, can shift to a particular dimension to work from as his datum. The zero shifter assembly 80 is shown partially in FIG. 7. There it will be seen that an adjusting screw 81 is provided on the outside of the housing which coacts with the adjusting screw bushing 82 to provide a means for positively engaging the objective mount 84 which is shiftable laterally along the axis of the scale. As will be seen, the objective housing 85 is threadedly engaged within the shiftable objective mount 84 to provide for focusing the same. The objective cell 86 is mounted within the objective housing 85. To provide for sealing the interior, a washer 88 engaging an O-ring 89 is positioned between the shiftable objective mount 84 and the housing. A rigid immovable objective mount 90 is recessed slightly within the housing, and provides support for the objective cover 91 which is shiftable along its base flange 92. The elements are proportioned so that upon rotation of the adjusting screw 81, the shiftable objective mount 84 is biased by the zero shifter spring 94, and can be moved along the axis of the scale 15 and with relation thereto. Here it will be further appreciated that the principal adjustments, mounts, and movements of the optical measuring device are rectilinear. In addition to what was described above as to mounting, it becomes apparent that the zero shifter operates in parallel relation to the scale.

The scale optical system 100 is shown schematically in FIG. 14 which includes the scale semi-reflector 28 and scale mirrors 111, 112, 113, and 114. The relationship between the mirrors and the semi-reflector will be better appreciated as the scale optical system 100 is traced through the measuring device as shown in FIG. 10. There it will be seen that when the image is picked off the scale 15, it passes through the scale objective 20, first through the outer objective doublet 101 and then the inner objective doublet 102. The illumination from the lamp 25 is transmitted onto the scale by means of the scale semi-reflector 28, which also permits the image to pass on to scale mirror 111 as shown at the right hand portion of FIG. 10, thence downwardly to scale mirror 112. Scale mirror 113 is behind scale mirror 112 in the view shown in FIG. 10 and takes the image across the housing until the same is transmitted forwardly to the scale mirror 114 which is the final reflector of the scale image for transfer upwardly through the shiftable screen 30 and ultimate viewing through the magnifier lens 26. It will be observed particularly in FIG. 10 that the shiftable screen 30 and the sector cam 40 are substantially in the same plane, coupled by means of cam follower 57, and the balance of the optical system 100 for the scale is below this plane, and the axis of the scale objective 20 is closely adjacent thereto. Thus the bulk of the unit, including the illuminating lens, is all substantially lowered below the scale reading axis 106.

Figure 12:
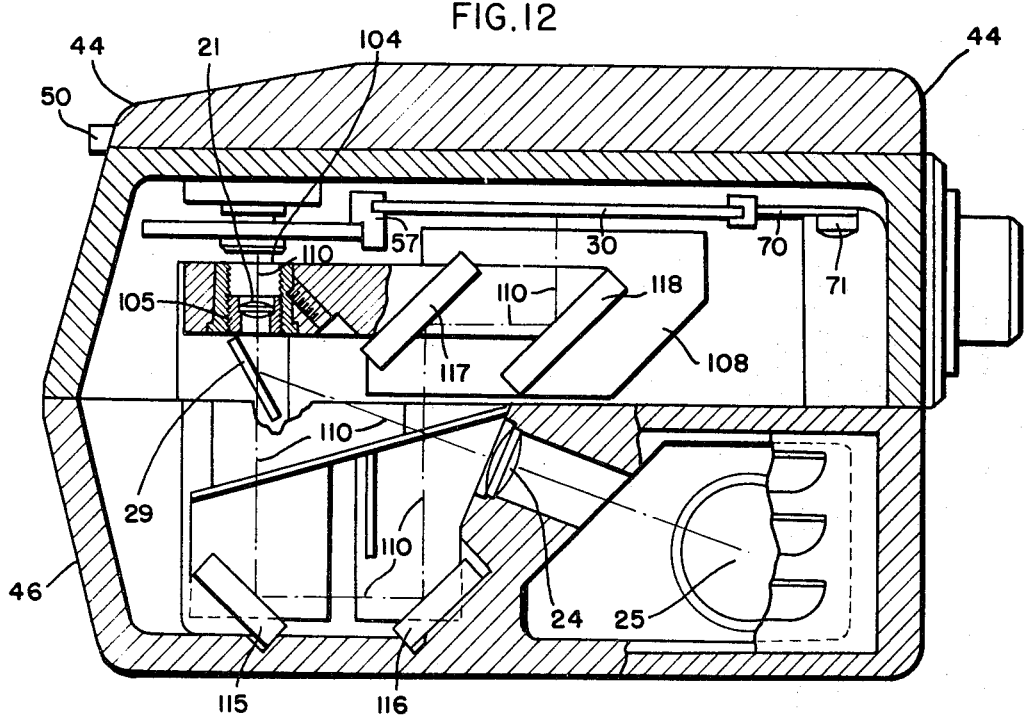
FIG. 12 is a partially broken view taken from the opposite side of the housing shown in FIG. 10 generally along section lines 12—12 of FIG. 11 and illustrating the sector optical system.

The sector optical system is reversely viewed from the presentation shown in FIG. 10, and appears in FIG. 12. There it will be seen that the sector objective 21 reads the image from the cam sector 40 and transmits the same along the sector optical system 110 to the sector semi-reflector 29. The sector semi-reflector 29 serves the twofold purpose of receiving the illumination from the lamp 25, transmitted through the sector condenser 24 and reflected off the underside of the cam sector 40 and then, in effect, bounced backwardly through the semi-reflector 29. The objective 21 includes the objective housing 104 and the objective mount 105, as shown immediately beneath the sector cam 40. The image thereafter moves downwardly on the left hand side of FIG. 12 to sector mirror 115, then to the right to sector mirror 116, upwardly to sector mirror 117, again to the right to the last sector mirror 118, and upwardly onto the shiftable scale 30 for viewing through the magnifier lens 26.

Figure 13:
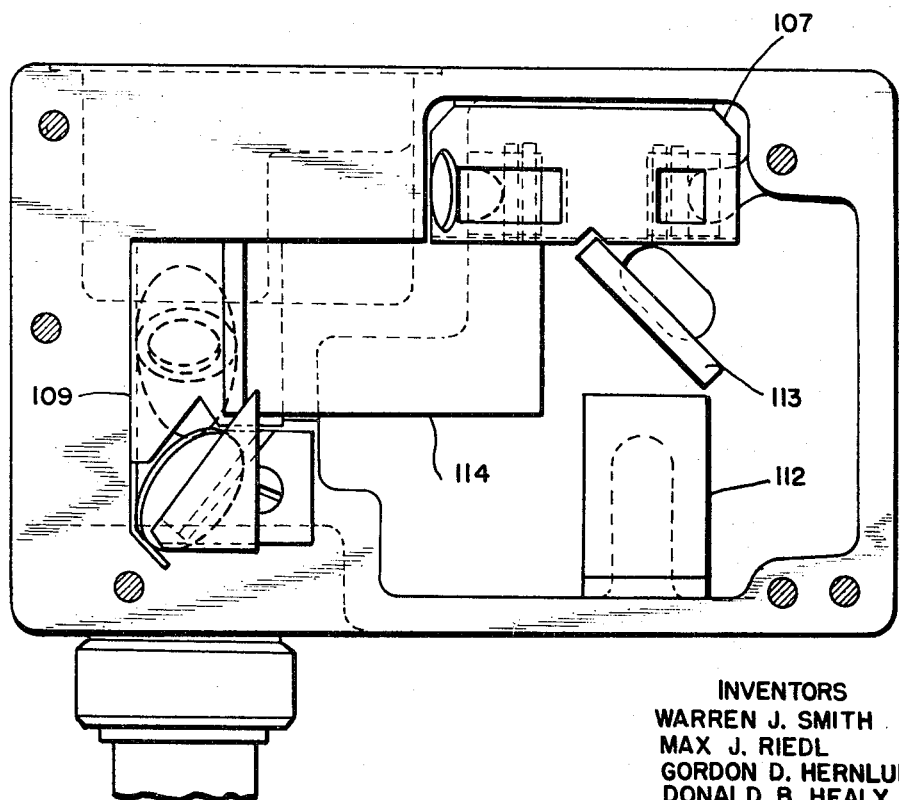
FIG. 13 is a top view of the lower housing taken along section line 13—13 of FIG. 10.

The removable lamp 25 is appropriately internally shielded by means of sector baffle 107 (see FIG. 13) and objective baffle 109 (see FIG. 13) as well as shiftable screen mask baffle 108 (see FIG. 12).

Referring now to FIG. 11, it will be seen that the lamp 25 is removably secured in the lower housing 46 generally by means of the configuration of lamp assembly 120. The lamp assembly 120 carries the illuminating cord through a male connector 122 having a mounting pin 124 which engages a bayonet socket 125 within the lower housing 46. The lamp 25 having a lamp base 126 is screwed into, or otherwise secured to, lamp base socket 128, and electrically connected to the leads 129 of the cord 121. The lamp bulb 25 fits within a light chamber 130 which is covered by means of a louvered lamp cover 131 forming a light chamber vent. Thus it will be apparent that the light chamber 30 is baffled by means of sector baffle 107, shiftable screen mask baffle 108, and objective baffle 109, to the end that light is permitted to move out only along the scale optical system 100, and the sector optical system 110, the scale optical system 100 being shown in FIG. 11 where the optical axis from the lamp 25 proceeds through scale condenser 22 and then to semi-reflector 28; and similarly shown in FIG. 12 where the illumination from the lamp 25 proceeds along the sector optical system 110 through the sector condenser 24 and thence to the sector semi-reflector 29.

In the commercial embodiment shown, the compactness of the system will be appreciated when it is understood that, for example, in FIG. 10 the total vertical height of the housing is 2.687″, the width as shown in FIG. 7 (including the zero shifter knob 81) is 3″, and the total length from front to rear also as shown in FIG. 7 to the forward portion of the objective cover 91, is 4.406″. The clearance between the optical axis of the scale objective 20 and the top of the cover 44 as shown in FIG. 6 is slightly under 1″. Therefore, not only has an unusual compactness been achieved through the design of the subject optical measuring device 10, but critical clearances have been held to a minimum.

In review it will be appreciated that the illustrative optical measuring device 10 permits the employment of a relatively economical scale 15 in which scale indicia may be spaced as far apart as $1/10''$. Nevertheless, with optical precision and excellent illumination, the same can be directly read to plus or minus $1/10,000''$ or the corresponding metric or angular divisions. A single illuminating lamp 25 has been provided which is readily removable for servicing, and readily available in commercial quantities with a designed lifetime of 2,000 hours, thus permitting virtually trouble-free usage of the unit for a year without servicing. The various components are so designed that with the shiftable members they are still sealed from ambient contaminants, again rendering the design relatively service- and trouble-free. The rectilinear relationships between all major axes of mounting and reading permit easy modification of varying machine tools and other measuring equipment to the mounting of the precision optical measuring device.

Although particular embodiments of the invention have been shown in physical form above, it will be appreciated that a method is inherent in the structure which transcends the particular structure shown. The method, in broad outline, as set forth at the outset of this description, contemplates the dividing of scale indicia by shifting a vernier type divider between adjacent ones of the scale indicia with rotating member having a peripheral eccentricity. The radial measure of displacement of the rotating member is further used to divide the scale distance. While in the embodiments shown the indicia on the scale are projected onto the shiftable member, the same could be transmitted to a remote location in a hot room, for example, or in applications where the bed travel of an unusually long bed is involved and the control area is at a position remote from the scale. Therefore the method is independent of the ultimate orientation of the reading, but rather dependent upon the method of shifting a vernier with a member having a cam-like or eccentric surface, and then reading the radial travel thereof.

Although particular embodiments of the invention both as to apparatus and method have been shown and described in full here, there is no intention to thereby limit the invention to the details of such embodiments or methods. On the contrary, the intention is to cover all modifications, alternative embodiments, usages and equivalents of the direct reading optical measuring device and method as fall within the spirit and scope of the invention, specification, and the appended claims.

We claim:

1. A direct reading optical measuring device comprising, in combination, a scale scanning objective for reading a scale having line indicia at $1/n$ spacing and numerical indicia associated with each $1/n$ line, a shiftable screen having line indicia and numerical indicia of $1/nm$ associated therewith for alignment in juxtaposed optical relationship with said scale line indicia, optical means for projecting the scale indicia onto the screen for alignment with the shiftable screen line indicia, a sector cam coupled mechanically to the shiftable screen, the cam being proportioned and oriented to shift the shiftable screen to position the line indicia on the nearest of the adjacent scale projected line indicia, numerical means in sector organization on the sector cam for reading the translation of the shiftable screen between the two numerical indicia thereupon responsive to rotation of the cam showing $1/nmp$ divisions, and window-mask means in optical engagement with the shiftable screen and sector cam for selectively masking the foregoing indicia, where:

$n=$ the reciprocal of the uniformly spaced indicia;
$m=$ the shiftable screen division of $1/n$;
$p=$ the cam sector division of $1/nm$;

to present, when the line indicia are aligned, an ordered sequential numerical readout.

2. The direct reading optical measuring device of claim 1 in which $n=10$; $m=10$; and $p=100$.

3. The direct reading optical measuring device of claim 2 employing the English system of measurement to thereby read from left to right $1/10$; $1/100$; $1/1,000$; and $1/10,000$ inches.

4. In the optical measuring device of claim 1, the objective being located above the major portion of the optical means and above a median plane in the device whereby a minimum of clearance is required between the top of the device and the optical axis of the objective facilitating mounting on the host machine tool.

5. In the optical measuring device of claim 1, alignment slots on the shiftable screen laterally displaced from the $1/nm$ indicia thereon, the optical means oriented and constrained to project the $1/n$ indicia from the scale to the left of the $1/nm$ indicia, the line indicia on the scale being adjustable centerable within the alignment slots of the shiftable screen with the $1/nmp$ sector indicia appearing to the right thereof.

6. In the direct reading optical measuring device of claim 1, a zero shifter comprising means for translating the scale scanning objective along the axis of the scale.

7. In the direct reading optical measuring device of claim 1, the shiftable screen having line and numerical indicia printed thereon for the $1/nm$ division.

8. In the direct reading optical measuring device of claim 1, the $1/nmp$ numerical indicia being printed in reflective relationship on the sector cam in sector orientation.

9. In the direct reading optical measuring device of claim 1, yieldable means urging the screen and sector came in coupled relationship, and counter yieldable means opposed thereto for the twofold purpose of balancing bearing loads and rendering rotating action uniform to the touch, and finger knob means coupled to the sector cam for rotating the same to shift the screen.

10. In the direct reading optical measuring device of claim 1, a sector cam of circular exterior configuration, means mounting the sector cam off center, thereby providing a cam action for the screen with the manufacturing economy of a circular member.

11. The method of dividing scale indicia uniformly spaced comprising the steps of transmitting the image of said indicia onto a shiftable vernier type member, and shffting the same to juxtapose the vernier type member with the line indicia by means of a rotating member having an eccentric trace on its periphery, and thereafter reading the radial displacement of the rotating member to further divide the position of the scale with reference to the vernier where the scale division reads $1/n$, the vernier division reads $1/nm$ and the radial division is $1/nmp$.

12. In the method of claim 11 above, the step of transmitting indicia on the scale associated with the line indicia to the shiftable member thereby reading the same directly.

13. In the method of claim 12 above, the additional step of providing radial indicia on the rotating member and transmitting the same to the shiftable member whereby all numerical indicia are read in a common ordered sequential direct reading manner.

References Cited
UNITED STATES PATENTS

| | | | |
|---|---|---|---|
| 3,354,778 | 11/1967 | Koller | 356—169 |
| 3,489,483 | 1/1970 | Kraus | 350—113 |
| 2,497,981 | 2/1950 | De Gramont. | |
| 3,031,923 | 5/1962 | Heidenhain | 353—41 |
| 3,053,143 | 9/1962 | Meier | 353—41 |
| 3,106,127 | 10/1963 | Koller. | |
| 3,363,963 | 1/1968 | Smith et al. | 353—41 |

FOREIGN PATENTS 978,078  12/1964  Great Britain.

SAMUEL S. MATTHEWS, Primary Examiner

U.S. Cl. X.R.

33—125